United States Patent [19]

Candy

[11] 3,913,016

[45] Oct. 14, 1975

[54] CIRCUIT FOR CURTAILING EFFECTS OF BIT ERRORS IN PULSE CODED TRANSMISSION

[75] Inventor: James Charles Candy, Convent Station, N.J.

[73] Assignee: Bell Telephone Laboratories, Incorporated, Murray Hill, N.J.

[22] Filed: Apr. 18, 1974

[21] Appl. No.: 461,879

[52] U.S. Cl............ 325/38 B; 178/68; 340/347 DD

[51] Int. Cl.$^2$........................................ H03K 13/22

[58] Field of Search........ 325/38 R, 38 A, 38 B, 41; 340/347 DD; 332/11 R, 11 D; 178/68

[56] References Cited

UNITED STATES PATENTS

| | | | |
|---|---|---|---|
| 3,300,774 | 1/1967 | Chatelon et al. | 340/347 DD |
| 3,716,789 | 2/1973 | Brown et al. | 325/38 A |
| 3,783,383 | 1/1974 | Forster et al. | 340/347 DD |
| 3,784,922 | 1/1974 | Blahunt | 325/38 B |

*Primary Examiner*—Benedict V. Safourek
*Attorney, Agent, or Firm*—C. S. Phelan

[57] ABSTRACT

A differentially pulse coded digital representation of a continuous analog signal is digitally accumulated, and each time polarity information indicates that the accumulated digital approximation changes sign the digital representation is complemented. The result of this action is that each bit of a predetermined type in the digital representation, and following the complementing point in a signal flow sense, has the same directional effect, on the digital accumulation, with respect to a predetermined signal reference level within the range of the continuous analog signal variation. Several embodiments are shown with different types of digital accumulation and different circuit locations for realizing the inversion of the digital representation.

24 Claims, 18 Drawing Figures

FIG. 3A
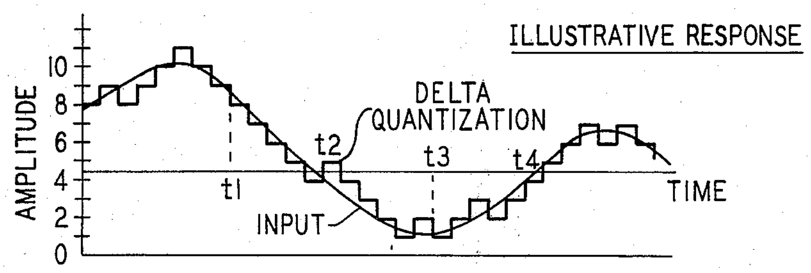
FIG. 3B
10111 0000000 1 0000 10 11 0 11111 0 1 00
t1 t3
FIG. 3C
ERROR ERROR
10111 00 1 0000 1 0000 1 1 1 1 0 11111 0 1 00
t1 t3
FIG. 3D
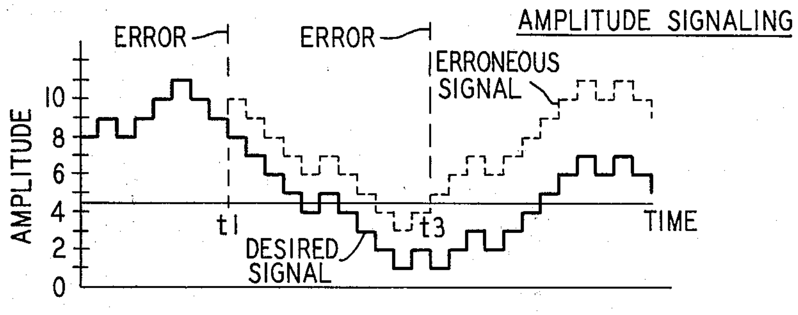
FIG. 3E
10111 000000000 111 0 1 00 1 000 11 0 1 00
t1 t3
FIG. 3F
ERROR ERROR
10111 00 1 000000 111 0000 1 000 11 0 1 00
t1 t3
FIG. 3G
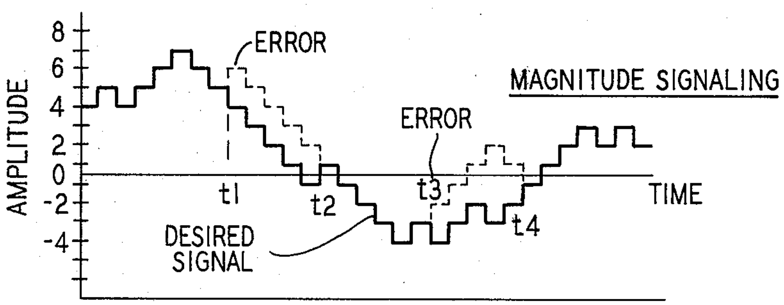

FIG. 7
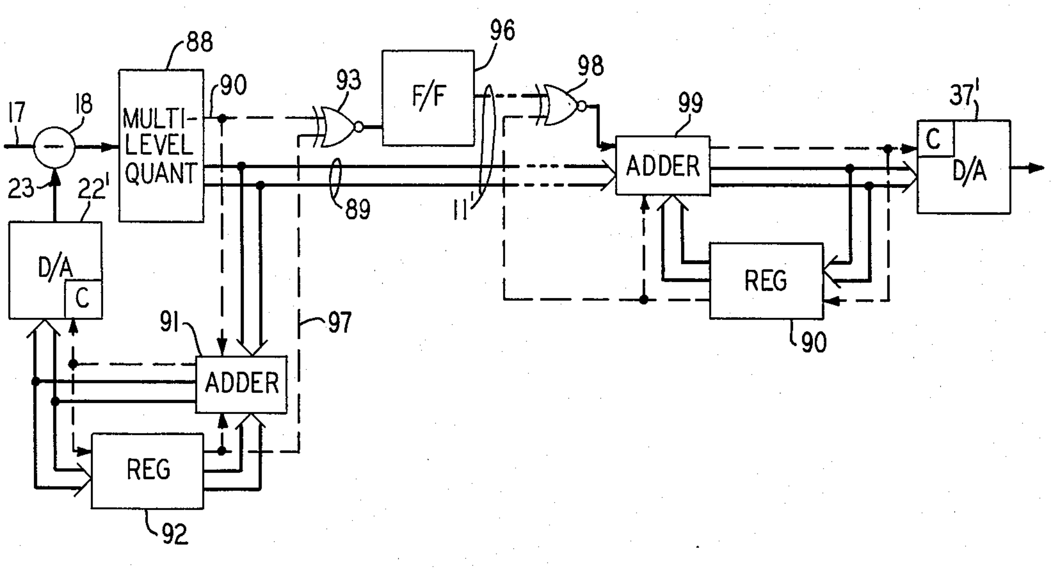
FIG. 8A
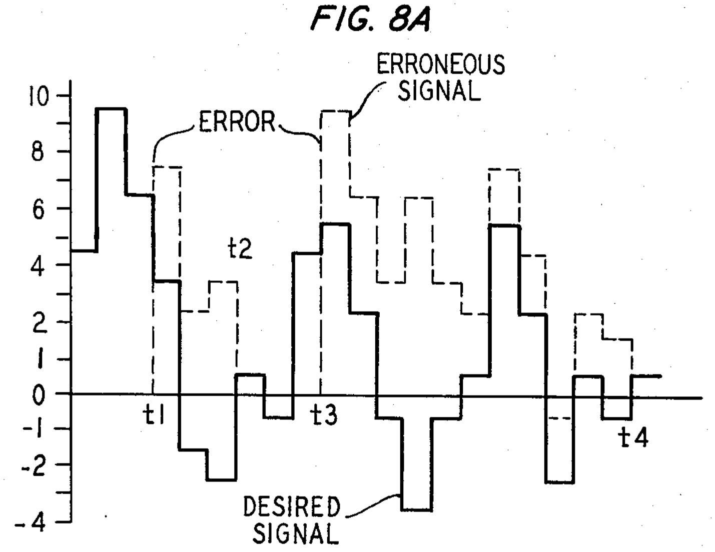
FIG. 8B
t1 t2 t3
+5-3-3-5-1+3-1+5+1-3-3-3+3+1+5-3-5
FIG. 8C
t1 t2 t3
+5-3-3-5+1-3-1-5+1-3-3+3-3-1+5-3-5
FIG. 8D
t1 t3
+1 +5

CIRCUIT FOR CURTAILING EFFECTS OF BIT ERRORS IN PULSE CODED TRANSMISSION

BACKGROUND OF THE INVENTION

1. Field of the Invention

This invention relates to digital communication systems; and it relates, in particular, to such systems which include signal accumulators that must be associated with a signal leakage function in order to prevent accumulation of the effect of digital signal transmission errors.

2. Description of the Prior Art

In delta modulation type coding, a continuous input analog signal is compared to a feedback discrete analog signal approximation of the input from a prior time interval. The resulting error signal is sampled for use in producing a digital output that expresses the nature of the difference between the continuous and the discrete analog signals. Some form of signal integration is employed in the coder feedback path, as well as in a receiving station decoder, to produce the discrete analog signal approximation from the coder digital output. However, a leakage function is needed in delta modulation type systems in order to prevent the retention of the effects of signal bit errors suffered during transmission since the retention of the effects of such errors causes significant signal degradation. In digital systems, the signal integration is accomplished by some form of digital signal accumulation. In these digital systems the leakage effect has been achieved either by regularly multiplying the accumulator signal by a factor which is slightly less than unity or, in video systems, by a periodic resetting of the digital storage element to a reference storage level in order to wipe out accumulated errors. Multiplication is expensive in circuit terms and periodic resetting is unsatisfactory in voice communication systems because they lack a dead time corresponding to the video sweep retrace time which provides the principal memory resetting opportunity.

STATEMENT OF THE INVENTION

The problems of the prior art are alleviated, in an illustrative embodiment of the present invention, by extracting from a digital signal accumulator, which is accumulating a digital signal representation, a signal that indicates when the digital approximation in the accumulator of a corresponding analog signal is changing sign. That indication is used to complement the digital representation so that the sense of the effect of digital step commands in the digital representation code is the same with respect to a predetermined reference amplitude level within the range of analog signal variation regardless of whether the analog signal is positive or negative with respect to that level. Thus, each time an erroneous digital accumulation assumes a level next to a reference level, and approaches the latter level from a direction opposite to that from which the desired approximation would have approached it, the previous transmission bit error is wiped out.

It is one feature of the invention that it permits the conversion of a digital representation to an analog format at the latest possible point in the circuit flow, and thereby facilitates the use of a nonlinear amplitude representation system for accumulating a digital signal approximation.

It is another feature that the transmission error curtailing technique is useful with different types of signal accumulation and with different types of coders and decoders.

A further feature is that use of the invention in an associated coder and decoder causes the respective digital signal accumulators to track one another with only minor transient signal differences immediately following transmission errors.

BRIEF DESCRIPTION OF THE DRAWING

A more complete understanding of the invention and the various features, objects, and advantages thereof may be obtained from a consideration of the following detailed description in conjunction with the appended claims and the attached drawing in which:

FIGS. 3A through 3G, 4A, and 4B are signal diagrams illustrating the operation of the invention;

FIGS. 7 and 8A–8D are a block and line diagram of another form of the invention and wave diagrams illustrating its operation.

DETAILED DESCRIPTION

Figure 1:
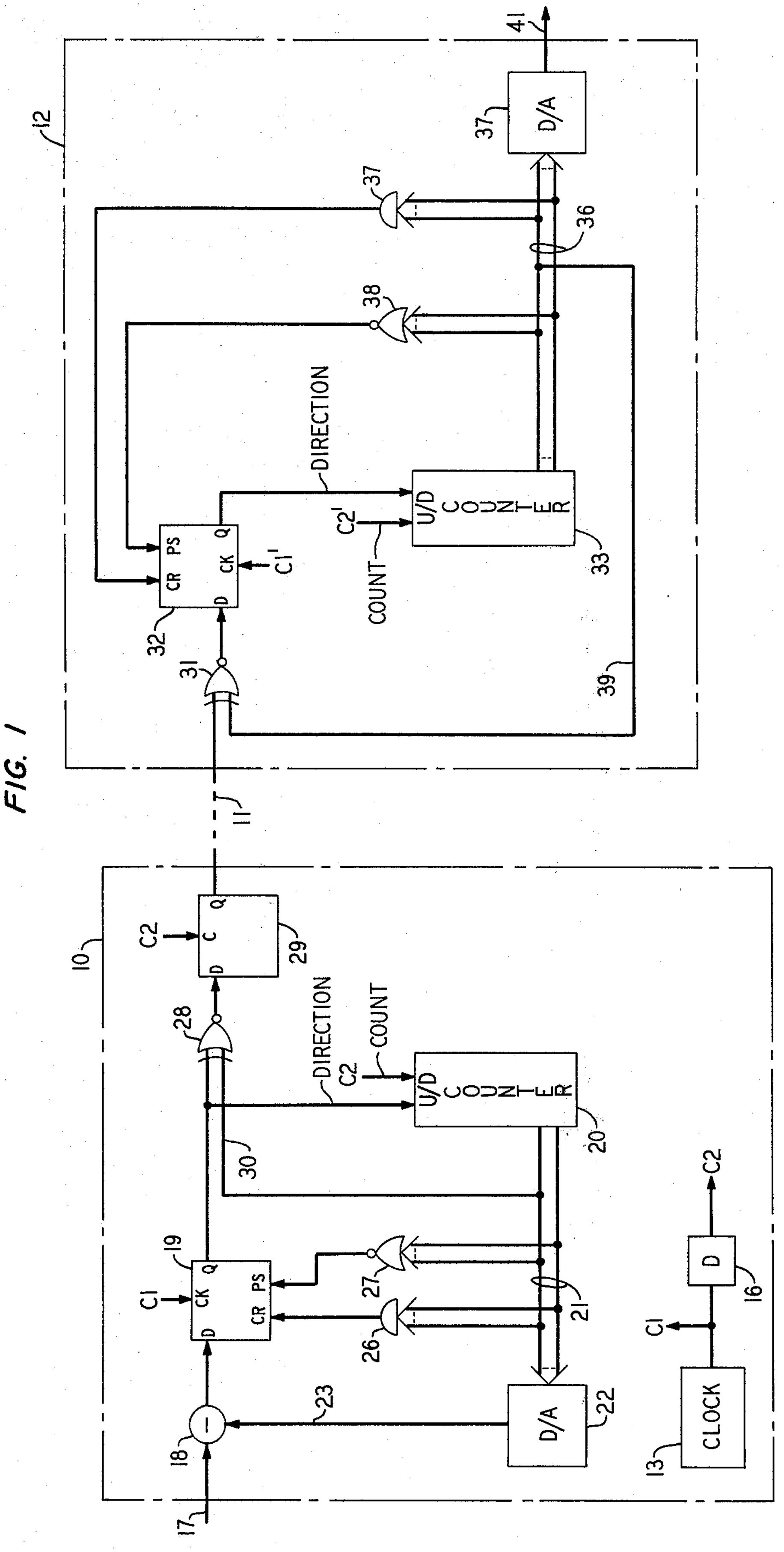
FIG. 1 is a block and line diagram of a digital communication system utilizing the present invention.

In the digital communication system of FIG. 1, a transmitting station 10 is coupled through a suitable transmission medium, such as circuit 11, to a receiving station 12. In the transmitting station 10 a clock signal source 13 provides a first clock signal C1 and a second clock signal C2 which is of the same frequency as the clock signal C1 but delayed somewhat therefrom by transmission through a suitable delay circuit 16. A delay equal to the transition time of four cascaded gates is usually adequate for purposes of the circuits to be described. The clock signals C1 and C2 are utilized at different points within the transmitting station 10 as indicated by corresponding reference characters.

A continuous analog input signal, such as, for example, a voice signal in a telephone communication system, is provided on a circuit 17 to one input of an analog subtraction circuit 18. A second input to the subtraction circuit 18 is a discrete analog approximation signal representing a portion of the signal on circuit 17 from a prior time interval. A difference signal appearing at the output of the subtraction circuit 18 is applied to a threshold circuit which, in this case, is advantageously a D-type bistable or flip-flop circuit 19. Such circuits are well known in the art and respond when enabled by a signal at a clocking input CK of the flip-flop circuit by assuming a binary stability state corresponding to the binary state of the signal at the D input of the flip-flop circuit. In addition, the D flip-flop circuits also include preset PS and clear CR inputs to which signals can be applied for causing the flip-flop circuit to assume a predetermined stability state whether or not the flip-flop circuit is enabled by a clock input signal. Such flip-flop circuits also usually include complementary outputs designated as Q and Q outputs, of which the Q output is at a high or a low binary signal level depending upon whether the signal at the D input to the flip-flop is in a high or a low signal level, respectively. Such a high Q output level also represents the set, or preset, state of the flip-flop circuit; and a low signal at the Q output represents a reset, or clear, state. The flip-flop circuit 19 receives the C1 clock signal at the clocking input thereof, and such signal advantageously has a frequency which is much greater than the Nyquist sampling frequency for analog signals of the type which are expected to be received on the input circuit 17.

The Q output of flip-flop circuit 19 is coupled to a direction control input of a digital accumulator such as a reversible binary counter 20 which also receives at its counting drive input connection the clock signals C2. The content of the counter increases when the flip-flop 19 is set and decreases when the flip-flop is reset. As illustrated in FIG. 1 the counter 20, and other counters to be hereinafter mentioned, are shown with the most significant bit stage at the upper portion thereof and the least significant bit stage at the lower portion thereof. Bit parallel outputs of counter 20 are coupled from respective counter stages through individual circuits of a cable 21 to input connections of a digital-to-analog converter 22. Counter 20 naturally generates two's- complement code including sign information in the most significant bit stage and magnitude information in the other stages. The converter 22 derives from the counter outputs a corresponding discrete analog signal approximation for application in a circuit 23 to the aforementioned second input of the subtraction circuit 18. Capacitive coupling, not separately shown, in circuits utilizing the converter output automatically restores the zero amplitude reference to the discrete analog approximation from the converter so that complementing logic responsive to the counter digital approximation sign is not required. Digital-to-analog converters of the type mentioned often comprise some form of resistance ladder network. Many forms thereof are known in the art but are not considered herein since details of the converter comprise no part of the present invention.

Each bit of the signal word on the cable 21 is also coupled to individual input connections of an AND gate 26 which responds to a coincidence of high output signals at all corresponding outputs of counter 20 to clear the flip-flop circuit 19. This connection provides overflow protection for the coder so that the counter 20, upon attaining a full-count status, it forced to count down for one cycle rather than recycle to the all-ZERO state. Similarly, the circuits of cable 21 are also coupled through a NOR gate 27 for presetting the flip-flop circuit 19 upon the occurrence of an all-ZERO state in the counter 20 for similarly protecting the coder against underflow, i.e., to prevent the counter from recycling in a single clock period to the all-ONE condition once it has achieved an all-ZERO condition.

Digital output from the Q output of bistable circuit 19 is also coupled through selectable inverting logic; such as an EXCLUSIVE OR type of function. In the illustrative embodiment an EXCLUSIVE NOR circuit 28 is employed and applies the digital signal through a further D flip-flop circuit 29 to the transmission circuit 11. The D flip-flop circuit 29 is clocked by the C2 signal for regenerating the digital format of the coder output so that pulses provided from the Q output of the flip-flop to the transmission circuit 11 are of substantially uniform amplitude and duration.

In accordance with an aspect of the present invention, a polarity change in the digital approximation of counter 20 is used to invert the bit series digital signal. To this end, a lead 30 connects the most significant bit output from counter 20 to a second input of the EXCLUSIVE NOR circuit 28. Thus, each time the most significant bit, i.e., the sign bit, of the digital contained in counter 20 changes binary state, the digital representation of the continuous analog signal is complemented. The effect of this complementing is to cause direction commands, provided to the receiving station 12 in the digital signal representation from coder 10, to be given in a magnitude sense rather than in an amplitude sense. That is, a pulse or a binary ONE always drives a digital approximation signal away from some predetermined reference amplitude level within the range of anticipated amplitude variations of the continuous analog signal input on circuit 17. Similarly, a no-pulse signal, i.e., a binary ZERO, always drives the digital approximation toward that predetermined reference level. This type of direction control is sometimes called inside signaling because the reference determining the direction of signal movement is within the analog signal variation range. A result of this type of control is that a transmission error injected into a bit of the digital representation will cause only a brief mistracking in the receiving station analog signal approximation because the signal mismatch is erased automatically at a digital accumulator when an erroneous digital accumulation assumes a level next to a reference level and approaches that level from a direction which is opposite to that from which the desired, correct approximation would have approached such reference level. This type of operation will be subsequently considered in greater detail in connection with FIGS. 3A–3G and 4A–4B herein.

The decoder in receiving station 12 performs essentially the same type of digital accumulation as is carried out in the feedback portion of the coder in transmitting station 10. An EXCLUSIVE NOR circuit 31 couples the digital signal representation from the transmission circuit 11 to the D input of a D flip-flop circuit 32. Clock signals are derived in the receiving station 12 from the input signals provided by the transmission circuit 11 by clock recovery circuits (not shown) of any suitable type. Such recovered clock signals are utilized to produce clock signals C1' and further signals C2', which are delayed with respect to the signals C1' in the fashion hereinbefore indicated for the transmitting terminal 10.

Clock signals C1' are applied to the clock input of the flip-flop circuit 32. A Q output from that flip-flop circuit provides direction control commands to a reversible binary counter 33 which receives the clock signals C2 as a counting drive therefor. Circuits of a cable 36 couple corresponding respective outputs of counter 33 to inputs of another digital-to-analog converter 37; and the output on lead 41 of the converter, after appropriate low-pass filtering (not shown), represents a continuous analog signal corresponding to that which was applied on circuit 17 at the transmitting station 10. The decoder is also provided with overflow protection by means of an AND gate 37 and underflow protection by means of a NOR gate 38, for controlling the clearing and presetting inputs, respectively, of flip-flop circuit 32 in the same fashion already described for those types of protection in connection with the transmitting station 10. A lead 39 couples the most significant bit stage output of counter 33 to a second input of the EXCLUSIVE NOR gate 31 for complementing the digital representation at the decoder input each time that the digital approximation provided by counter 33 changes sign. Thus, if a transmission error in circuit 11 causes the inversions in gates 28 and 31 to get out of step, the discrepancy will be erased at a subsequent zero crossing as previously outlined.

Figure 2:
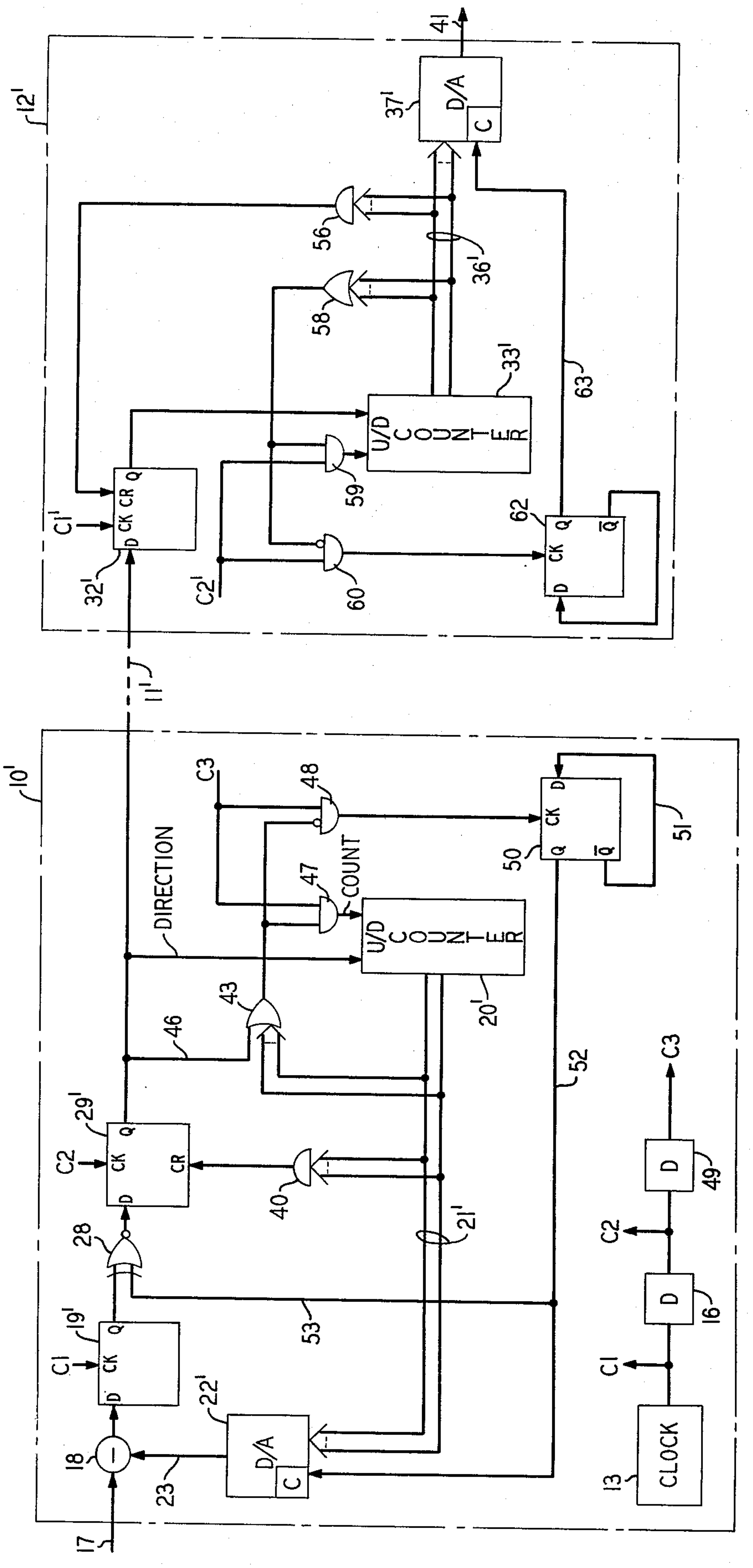
FIG. 2 is a modified form of the system of FIG. 1.

In FIG. 2 there is shown a modified form of the digital communication system of FIG. 1. Since the embodiment of FIG. 2 is in many respects similar to the embodiment of FIG. 1, corresponding elements are designated by the same or similar reference characters. In this case the modification comprises drawing the EXCLUSIVE NOR circuit 28 into the feedback loop of the coder in the transmission station 10. In particular, the coder feedback is derived from the Q output of the flip-flop circuit 29′ and applied to the direction control input of the counter 20′. In this embodiment, the counter 20′ holds only the magnitude of the binary code. A polarity bit is separately derived as will be subsequently described. Cable 21′ couples the binary coded signal representation of the digital approximation in counter 20′ to the digital-to-analog converter 22. Circuits in the cable 21′ are coupled through an AND gate 40 for clearing the flip-flop circuit 29′ to provide overflow protection of the type previously indicated in the case of FIG. 1.

In the FIG. 2 embodiment underflow protection and polarity responsive logic are combined. Thus, circuits in cable 21′ are applied to respective inputs of an OR gate 43. In addition, the Q output of flip-flop circuit 29 is coupled by a lead 46 to a further input of the gate 43. The output of gate 43 supplies an enabling input to AND gate 47 and an inhibiting input to an AND gate 48 if there is a binary ONE in any stage of counter 20′ or in the coder digital output. Clock signals C3, which are further delayed with respect to clock signals C2 by a delay circuit 49, supply actuating inputs to both of the gates 47 and 48. Thus, in normal operation each pulse in the coder digital output representation enables gate 47 to couple clock signals C3 for driving counter 20. However, upon a coincidence of low, i.e., no-pulse, signal conditions in the circuits 21′ from counter 20′ and in the lead 46 from flip-flop circuit 29′, the inhibiting input to gate 48 is removed and a clock pulse is diverted from the counter 20′ through gate 48 to the clock input of a further D flip-flop circuit 50 which is connected to operate as a toggle circuit. Thus, the $\bar{Q}$ output of flip-flop circuit 50 is connected by a lead 51 to the D input so that upon the occurrence of each clock pulse to the flip-flop circuit 50 that circuit changes state. Such a state change occurs each time that the counter 20′ is in the all-Zero condition and the flip-flop circuit 29′ gives a count down, i.e., no-pulse, command. That condition represents a need to change the polarity of the discrete analog approximation on lead 23, and it also indicates a need to prevent counter 20′ from immediately recycling to the all-ONE condition and thereby confusing coder operation. Both needs are met by the operation of gates 47 and 48 just described.

The Q output of flip-flop circuit 50 is applied by a lead 52 to complementing logic C of any convenient type in the digital-to-analog converter 22′ for changing polarity of the discrete analog output thereof. For example, logic C may select either the true or the complement of the digital output from counter 20′, or the logic may steer the converter analog output to either an inverting input or a noninverting input of an amplifier (not separately shown) for coupling to lead 23. In addition, a lead 53 couples the Q output of flip-flop circuit 50 to the second input of the EXCLUSIVE NOR circuit 28 to perform the digital signal inversion which was similarly directed by signals on the lead 30 in FIG. 1. Operation of the EXCLUSIVE NOR circuit 28 complements the digital input to the direction command input of counter 20 and thereby forces the counter to count upward even though the continuous analog signal on circuit 17 may still have a slope of the same sign, i.e., the amplitude has changed sign but slope has not.

In the receiving station 12′ of FIG. 2, the digital signal representation from transmission circuit 11 is applied directly to the D input of the D flip-flop circuit 32′ which is clocked by recovered clock signals as previously noted in connection with FIG. 1. The Q output of that flip-flop circuit provides direction commands to counter 33′ which has its bit-parallel digital outputs coupled by circuits of cable 36′ to the digital-to-analog converter 37′. Overflow protection is provided, in the fashion previously indicated for transmitting station 10′, by an AND gate 56 that is responsive to signals on circuits of cable 36′ for clearing flip-flop circuit 32′ upon the occurrence of an all-ONE state in counter 33′. Similarly, signals from cable 36′ are applied through an OR gate 58 for enabling an AND gate 59 and inhibiting an AND gate 60, to provide both underflow protection and polarity change detection in the same fashion previously outlined in connection with the counter 20′ of the transmitting station 10′. The diversion of a clock pulse from counter 33′, upon detection of a need for polarity reversal, causes a C2′ clock pulse to be applied to the clock input of a D flip-flop circuit 62 which is connected to operate as a toggle circuit. The Q output of that flip-flop circuit is applied by a lead 63 to the complementing logic C in digital-to-analog converter 37′ for providing the sign information thereto.

It can thus be determined from the similarity between the accumulators of the coder and decoder in the embodiments of FIGS. 1 and 2, respectively, that a receiving accumulator will track its associated transmitting accumulator. Similarly, if a transmission error should occur in the forward signal path of the systems of FIGS. 1 and 2 beyond, in a signal flow sense, the EXCLUSIVE NOR circuit 28, that transmission error is erased at any following digital accumulator when the erroneous discrete digital approximation approaches the direction reference level in a direction opposite from that in which the correct approximation would have approached it.

FIGS. 3A through 3G are diagrams which illustrate operation of the digital code inverting logic such as the EXCLUSIVE NOR circuit 28. Arbitrary amplitude units utilized in FIGS. 3A, 3D, and 3G are the same but are numbered differently in FIGS. 3A and 3D as compared to 3G to facilitate an understanding of the operation of the invention. It has been found that the operation of the logic tends to curtail the effects of transmission errors which may occur in the digital signal at any point in the system after the EXCLUSIVE NOR logic. Thus, this logic serves in a digital fashion the function of a leakage resistance in an analog integrator, which leakage causes such transmission errors to be dissipated in a limited number of bit times rather than causing a permanent displacement between the operations of the encoder feedback approximation and the decoder analog approximation.

FIG. 3A illustrates a superimposed analog signal variation and the corresponding discrete analog approximation as would be produced in the FIG. 1 coder and decoder with leads 30 and 39 open circuited. No transmission errors are shown in FIG. 3A. FIG 3B represents in binary ONE-ZERO fashion the contents of the 1-bit coder output signal train which would produce the stepped analog approximation of FIG. 3A without transmission errors. FIG. 3C includes the same information as FIG. 3B, but it further includes at times $t1$ and $t3$ transmission errors which have changed a binary ZERO bit to a binary ONE bit.

FIG. 3D illustrates, by the dotted wave diagram designated "erroneous signal," the effect of the transmission errors depicted in FIG. 3C on a hypothetical coder which lacks the desired leakage function in either analog or digital form. That is, conventional amplitude signaling is employed wherein a binary bit of a certain type employs always drives the approximation in the same direction with respect to a reference level, e.g., the zero level in FIG. 3D, outside the range of continous analog signal variation regardless of the continuous analog value with respect to another level, e.g., the 4.5-unit level in FIG. 3D, within that range. The error signal occurring at time $t1$ actually causes the analog approximation to step up instead of down, as would have been the case for the desired signal. This displacement between the erroneous signal and the path that the desired signal would have followed in the absence of the transmission error persists indefinitely in the absence of some form of leakage. Upon the occurrence of a second transmission error at time $t3$, which error is of the same type as the first error at time $t1$, the displacement increases. Usually such errors occur in a system in a fashion so that they affect the analog approximation produced in the decoder but do not affect the approximation produced in the coder. Consequently, there is a displacement between those two approximations. Displacement is particularly objectionable in systems where the digital accumulation employes a companded, i.e., nonuniform, coding rule.

FIG. 3E illustrates in binary ONE-ZERO form the 1-bit coder signal output on circuit 11 from the coder of FIG. 1 or FIG. 2. This diagram presents the same information contained in FIG. 3B but with the modifications which reflect the employment of the EXCLUSIVE NOR inverting logic. Thus, it is seen that the digital signal in FIG. 3E is complemented, as compared to that in FIG. 3B, each time the analog input crosses the intermediate amplitude axis at 4.5 amplitude units.

FIG. 3G illustrates by the solid-line wave diagram the analog approximation that is produced by the digital information of FIG. 3E. In FIG. 3G the amplitude units are numbered positively and negatively with respect to a zero reference level inside the range of analog signal variation. In order to maintain correspondence of levels with FIGS. 3A and 3D, the numbering of levels in FIG. 3G is necessarily distorted, as compared to actual amplitude values, adjacent to the zero level.

FIG. 3F represents the same information contained in FIG. 3E but includes, in addition, the two transmission errors at the times $t1$ and $t3$ already mentioned in connection with FIG. 3C. For the purpose of this discussion an error is regarded as a change of the code, therefore in FIG. 3F the $t3$ error appears as a change from a binary ONE to a binary ZERO in view of the complementing which occurred after the input analog signal crossed the zero amplitude axis for the first time. This erroneous digital information produces an analog approximation which conforms to the dotted wave diagram of FIG. 3G. Thus, there is after the time $t1$ error a displacement between the erroneous signal diagram and the desired signal diagram. However, at time $t2$, following the crossing of the analog signal into the negative amplitude region, the slope of the continuous analog signal is such that the desired discrete approximation would have experienced multiple zero-axis crossings before the erroneous discrete approximation reaches the zero-axis. Consequently the two approximations are brought into coincidence on level number 1 at time $t2$, and the displacement is wiped out. It was the inversion in the EXCLUSIVE NOR logic which brought two signal approximation diagrams into concurrence by causing each ZERO to drive toward the zero axis and each ONE to drive away from it, regardless of polarity with respect to the axis.

There is no further displacement until the occurrence of the second error at time $t3$. Similarly, the effect of the second error is wiped out at time $t4$ just prior to the next zero axis crossing of the input analog signal. These momentary displacements, as a result of transmission errors in the diagram of FIG. 3G, have been found to be imperceptible to the human ear for audio purposes.

Since magnitude, or inside, signaling has the same effects with respect to the amplitude reference level whether the continuous analog signal is positive or negative with respect to that level, signal polarity information cannot be readily communicated to a receiving station in a digital communication system utilizing a 1-bit digital code of the type produced by the coders already herein described. Nevertheless there should be no persistent mismatch between receiving station functions and transmitting station functions as a result of a transmission error. This freedom from a persistent spurious mistracking applies also to the case of a signal inversion which may be due to a transmission error as illustrated, for example, at time $t1$ in FIG. 4A. There the correct digital code is indicated across the top of the wave diagram and would produce the correct response indicated by the solid-line wave diagram in FIG. 4A. However, assuming that the initial binary ONE at time $t1$ was erroneously converted to a binary ZERO prior to arrival at the receiving station of the system, an erroneous signal response would be produced for a short time as indicated by the dashed wave diagram portion in FIG. 4A. In this case the error caused the actual digital approximation at the receiving station to cross the zero axis which appears between the arbitrarily numbered amplitude levels 4 and 5 in the drawing. The erroneous condition persists for only five coder cycles until it is erased at time $t2$ when the two digital approximations are brought into coincidence at the level number 5.

Figure 4A:
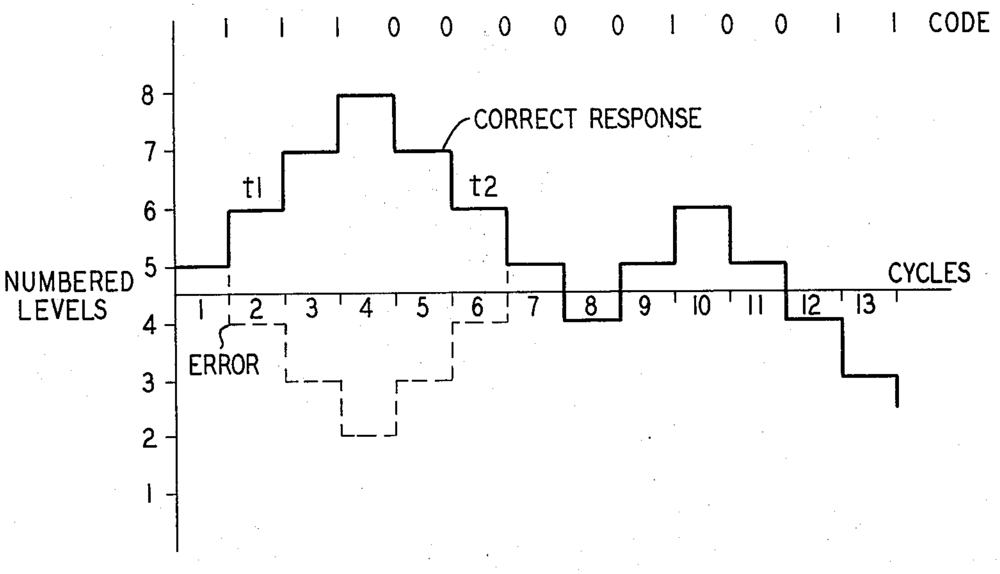
Figure 4B:
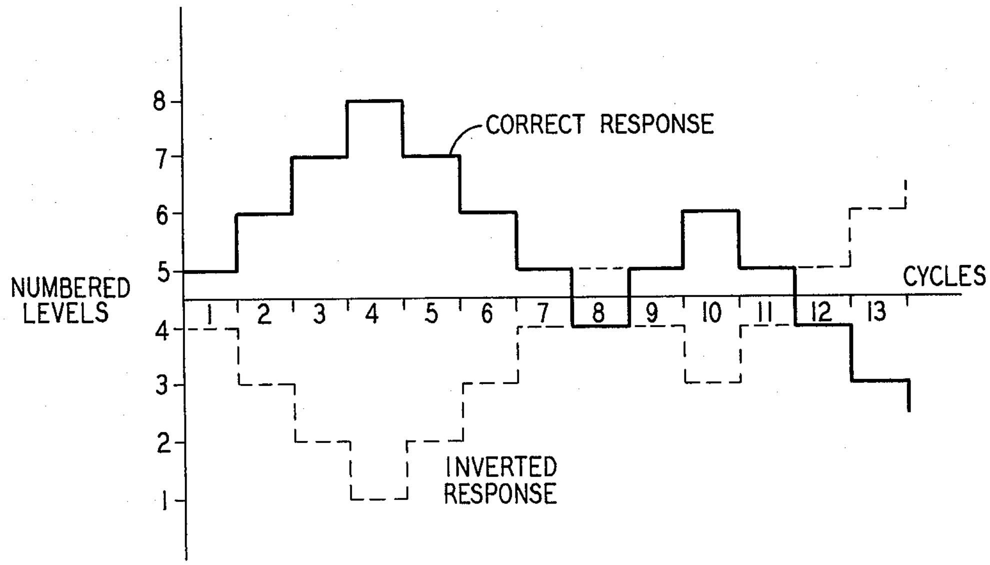

It is, however, possible that an erroneous phase inversion of the digital approximation could be caused by an incorrect start-up or by loss of system synchronization, and FIG. 4B illustrates such an occurrence. In this situation the inverted response has assumed even numbered amplitude levels in odd numbered coder cycles and vice versa, whereas the correct response would have been the assumption of odd numbered levels in odd numbered cycles and even numbered levels in even numbered cycles. An inversion of this type is not automatically corrected by the digital code inverting logic of the invention since the correct and erroneous digital approximations can never be brought into coincidence at a common amplitude level. However, the situation is not particularly serious. For example, in the case of loss of system synchronization, it is usually necessary for the entire digital system, of whatever type, to interrupt normal information transmission and resynchronize. The same is true of digital transmission systems including the present invention. If the signal inversion of the type shown in FIG. 4B should occur as a result of an incorrect start-up procedure, there would nevertheless be no significant human-perceptible difference between the inverted and correct digital approximations, as is apparent from the fact that such inversions often occur in interconnecting different portions of audio systems of various kinds in the present state of the art. Furthermore, if the inverted response of FIG. 4B were to be caused by a transmission error which appeared in a coder at a point in the signal flow path which was prior to the digital code inverting logic, the result would be a single audible click in the reproduced continuous analog output signal at the receiving station.

Figure 5:
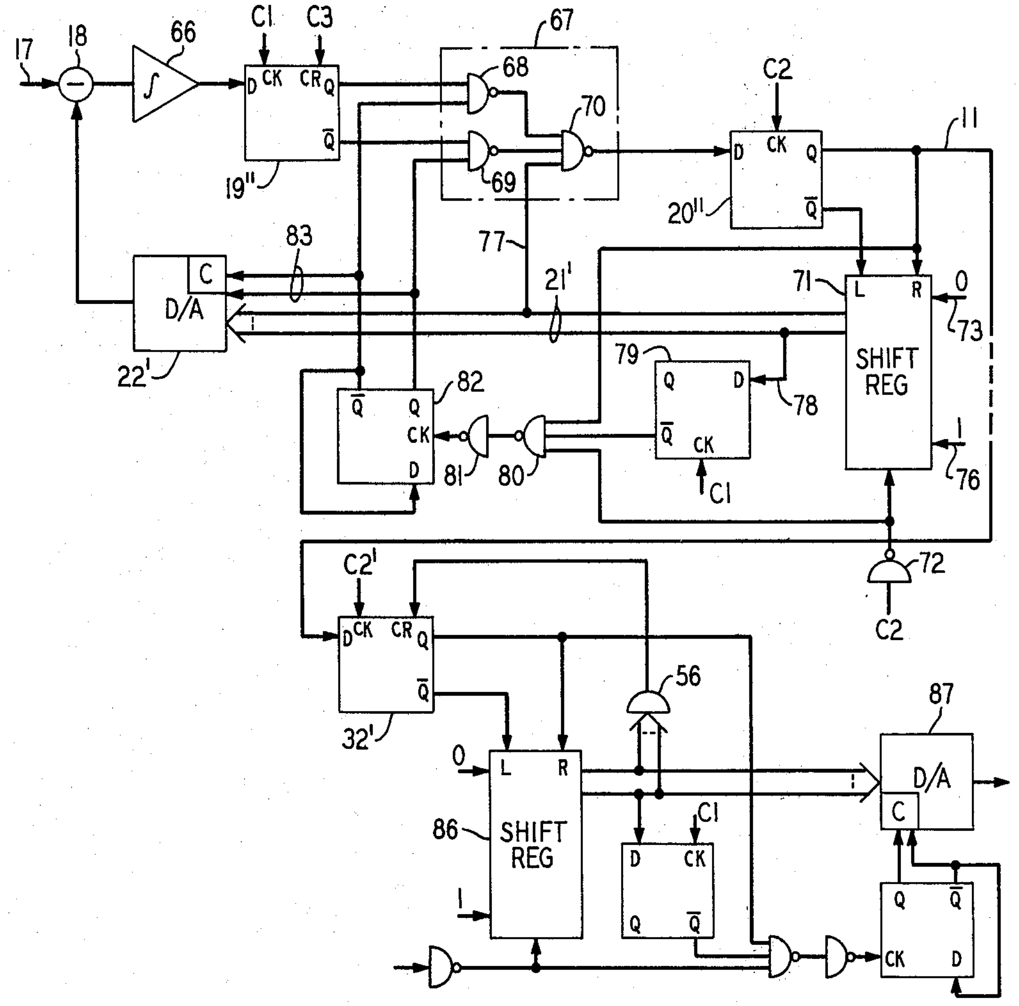
FIGS. 5 and 6 are a block and line diagram of a further form of the invention and a wave diagram illustrating its operation.

In FIG. 5 there is shown a block and line diagram of a coder of a type which is discussed in greater detail in the copending R. C. Brainard and J. C. Candy application Ser. No. 461,878, filed on even date herewith, entitled "Differential Pulse Coded Systems Using Shift Register Companding," and assigned to the same assignee as the present application. This coder is similar in many respects to that which was described in connection with FIG. 2, and corresponding circuit elements are designated by the same or similar reference characters. In this coder an integrator 66 is interposed between the output of subtraction circuit 18 and the D input of the flip-flop circuit 19″. This integration facilitates coder operation in a time interpolation mode which permits the digital portion of the coder to operate with respect to a small number of discrete amplitude levels, but to move among those levels at a high rate so that the average value of the digital approximation corresponds to one of a plurality of predetermined intermediate levels between a pair of the discrete digital levels.

In this embodiment the flip-flop circuit 19″ is cleared by the C3 clock signal following each C1 clock signal which enables that flip-flop to respond to the analog signal level at the D input thereof. Q and $\bar{Q}$ outputs of flip-flop circuit 19′ are applied to digital code inverting logic 67 which is in the form of EXCLUSIVE OR logic adapted to receive double-rail logic input signals. The logic 67 includes input NAND gates 68 and 69 which receive the Q and $\bar{Q}$ outputs of flip-flop circuit 19″. Outputs of those gates are applied to respective inputs of a further NAND gate 70 which has its output connected to the D input of the flip-flop circuit 20″. Q and $\bar{Q}$ outputs of the latter flip-flop provide double-rail logic direction commands to the R and L inputs of a shift register 71 for controlling right and left shifting therein. Actually, however, as illustrated in FIG. 5, the shift register is shown in a vertical position with its most significant bit stage at the upper portion thereof and its least significant bit state at the lower portion thereof. C2 clock signals provide shift drive to the register 71 after application through a NAND gate 72, for delaying the shift drive with respect to the operation of flip-flop circuit 20″ to be sure that the latter circuit has settled before shift register 71 is operated.

A circuit 73 is provided for injecting binary ZEROs into the most significant bit stage of the register during right-shifting, i.e, down-shifting as illustrated, operations in the register and a similar circuit 76 injects binary ONEs into the least significant bit stage during up-shifting or left-shifting operations. An up shift is directed by a coder output pulse condition, i.e., a high Q output, from flip-flop circuit 20″. Similarly, a down shift is directed by a no-pulse condition in the digital output, i.e., a high output, from the $\bar{Q}$ output of flip-flop circuit 20″. The effect of these shift register arrangements is to cause register 71 to contain a binary code representation defining amplitudes corresponding to segment boundaries in a segmented pulse code corresponding to a linear piece-wise approximation of a mu-law companded code. Such a representation is sometimes called a shift companded code or an *m:m* code, i.e., a code representation having all ONEs grouped at the least significant end of a word and all ZEROs grouped at the other end.

Shift register 71 contains only magnitude information and outputs from respective stages thereof are coupled by circuits in the cable 21′ to inputs of the digital-to-analog converter 22′. Overflow protection is provided by a lead 77 which connects the most significant bit circuit in cable 21′ to an input of NAND gate 70 in the inverting logic 67. Thus, anytime at which the register 71 assumes the all-ONE condition, a high input is provided by circuit 77 to a NAND gate 70 for thereby forcing its output to the low binary signal state so that flip-flop circuit 20 is forced to the reset state upon the occurrence of the next C2 clock signal. This drives the $\bar{Q}$ output of the flip-flop circuit high and forces the shift register to shift down regardless of the condition of the digital output from flip-flop circuit output 19″. That shifting operation causes a binary ZERO to be injected in the most significant bit stage and thereby remove the high forcing signal from lead 77 so that the coder is once more responsive to digital output from flip-flop circuit 19″. Although the shift register 71, as herein described, cannot turn over from an all-ONE state to an all-ZERO state in a single bit time as can a counter, the overflow protection is necessary in order to maintain the correct phase response of the type illustrated in FIG. 4A, that is, to maintain the coder digital approximation at odd numbered levels during odd cycles and at even numbered levels at even cycles.

Polarity information is derived from the shift register 71 by a lead 78 which connects the least significant bit circuit of cable 21′ to the D input of a flip-flop circuit 79 which is clocked by the C1 clock signals. The $\bar{Q}$ output of flip-flop circuit 79 is applied to an input of a NAND gate 80, along with the inverted C2 clock signals from gate 72 and the coder digital output from the transmission circuit 11. These three signals cooperate to produce a high output from gate 80 when shift register 71 is in the all-ZERO state, and a no-pulse condition in the coder digital output would tend to drive the shift register downward again. That low signal is inverted by a NAND gate 81 and utilized to clock a toggle-connected D flip-flop circuit 82.

The Q and $\bar{Q}$ outputs of flip-flop circuit 82 supply double-rail logic sign information on circuits 83 to the sign control input of digital-to-analog converter 22′. The same outputs of the flip-flop circuit 82 are applied to gates 69 and 68, respectively, in the inverting logic 67 for selecting either the true or the complement output of flip-flop circuit 19''. Thus, any attempt to drive the shift register into what might be called an underflow condition causes flip-flop circuit 82 to be toggled and thereby complement both the digital input to converter 22' and the digital output from flip-flop circuit 19''.

A decoder corresponding to the coder of FIG. 5 is of the same type as the circuits included in the feedback path of the coder of FIG. 5. That is, digital signals from transmission circuit 11 are employed to give direction commands to a shift register 86 connected as was the shift register 71. Magnitude bits from register 86 are applied to a digital-to-analog converter 87 of the same type as converter 37' which also receives polarity information derived from the shift register in the same fashion illustrated in connection with flip-flop circuits 79 and 82. No separate digital code inverting logic is required in the decoder for the same reasons already noted in connection with the digital system of FIG. 2, wherein the transmitter included inverting logic within the coder feedback loop.

Figure 6:
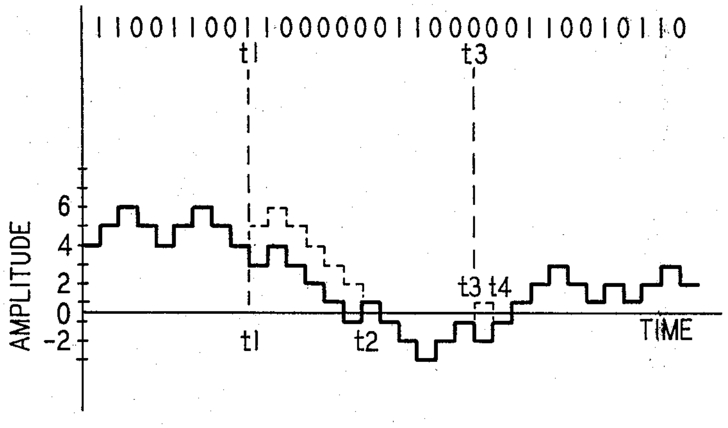

FIG. 6 shows wave diagrams illustrating the operation of FIG. 5 in a fashion corresponding to the illustrations of FIGS. 3F and 3G with respect to the operation of FIG. 1. Thus, both the erroneous and the desired signals are shown with errors at times $t1$ and $t3$ in the FIG. 5 time interpolation embodiment. A uniform coding rule is shown in FIG. 6 for convenience of illustration, but the extension to a nonuniform companded coding would show the same type of operation over a much larger amplitude range. FIG. 6 shows that the effects of transmission errors are rapidly curtailed.

FIG. 7 is a simplified block and line diagram of a multilevel, i.e., multibit, coder arranged to perform error curtailing of the type hereinbefore described in connection with single-bit coders in FIGS. 1, 2 and 5. Although the error curtailing effect can be achieved in multibit coders, it may be less advantageous in some applications than it is in single-bit coders because a relatively long time is often required to curtail some types of errors. Insofar as the embodiment of FIG. 1 includes portions which are the same as, or similar to, those in prior embodiments the same or similar reference characters have been employed.

The continuous analog input signal is applied on the circuit 17 to a subtractor 18 in which it is compared with a discrete analog approximation on the lead 23 in the coder feedback path. The difference, or error, signal output from subtractor 18 is applied to a multilevel quantizer 88 in which the error signal is converted to one of plural multibit binary coded digital words representing different possible amplitudes for the error signal. Quantizers of this type, providing sign-magnitude binary coded output, are known in the art. For purposes of the present embodiment, it is necessary only to specify additionally that the quantizing levels selected for the quantizers 88 have values such that the sum of no even number of levels can equal the sum of any odd number of levels. This design caution will help to avoid the occurrence of digital signal inversions of the type illustrated in FIG. 4B. Magnitude bits in the output of quantizer 88 are indicated by a solid-line cable 89, and the sign bit is indicated on a dashed-line circuit 90. This schematic representation is followed throughout FIG. 7.

The multibit quantizer output is applied to the coder feedback at the inputs of a digital adder 91. A sum output from the adder is coupled to the corresponding magnitude and sign input connections of the digital-to-analog converter 22'. Those same adder outputs are coupled through a register 92 to a second input of the adder 91. Register 92 is operated by clock signals, not shown, to provide a one sample time delay for the feedback shown to the adder 91. This adder and delay register combination of a type constitute a multibit digital accumlation which is well known in the art.

Sign output from quantizer 88 is also applied to an input of an EXCLUSIVE NOR gate 93 and from that gate to a 1-bit delay register, such as the flip-flop circuit 96 which is advantageously a clocked D flip-flop of the type hereinbefore mentioned. Gate 93 receives an additional input on a lead 97 from the sign bit output of register 92 for inverting the sign of the coder digital output whenever the sign of the coder accumulated feedback sum changes. This has the effect of complementing the entire digital output of the coder which is applied to the transmission circuit 11'. Flip-flop circuit 96 is employed to regenerate the sign bit to facilitate its use in the receiving station decoder.

In the decoder, the circuit arrangement and operation are analogous to that of the FIG. 1 embodiment wherein the coder inversion was also accomplished outside of the coder feedback loop. Thus, in FIG. 7 an EXCLUSIVE NOR gate 98 receives the sign bit for application through that gate to an input of a digital adder 99. Magnitude bits from the circuit 11' are likewise applied to the input of that adder. The adder output is coupled through a delay register 90 which has its output, in turn, fed back to another input of the adder 99 for performing the digital accumulation function as already described in connection with the coder. In addition, the sign bit of the register output is applied to another input of gate 98 for reinverting the sign bit whenever the sign of the accumulated sum in register 90 changes. The sum output of adder 99 is also applied to the digital-to-analog converter 37'.

FIG. 8A is a wave diagram similar to the type of diagram shown in FIG. 3G and showing true and erroneous discrete analog approximations for the multibit coder of FIG. 7. For ease of drawing, it has been assumed that the quantizing levels are plus or minus one, plus or minus three, or plus or minus five. These levels, assumed for convenience disregard the previously stated prohibition against having levels which can combine to cause a signal inversion. As before, errors are assumed to occur at times $t1$ and $t3$.

FIG. 8B shows step values produced by quantizer 88 at successive times for generating the desired digital approximation shown in FIG. 8A. This contains no errors and does not show a digital inversion of the type previously mentioned in connection with gate 93.

FIG. 8C shows similar step values for the same digital approximation. Again it is assumed that there are no errors but now the digital inversion produced by gate 93 is indicated.

Finally, FIG. 8D indicates the errors at times $t1$ and t3 which produced a step of plus one instead of minus three at time $t1$, and a step of plus five instead of plus one at time $t3$. It can be seen in FIG. 8A that it was a relatively long time before the latter error could be eradicated at time $t4$. Although the errors assumed may have a low probability of occurrence, because they require multiple bits of a sample word to be affected, their occurrence is possible since bit-parallel transmission was assumed and each such circuit could experience different error conditions.

Although the present invention has been described in connection with particular embodiments thereof, it is to be understood that additional modifications, embodiments, and applications of the invention which will be apparent to those skilled in the art are included within the spirit and scope of the invention.

What is claimed is:

1. In a communication system,
a circuit for propagating difference pulse coded signals,
means coupled to said circuit for digitally accumulating said pulse coded signals to produce a pulse coded digital approximation of an analog signal represented by said difference pulse coded signal,
means for producing a signal indicating a change in polarity of said approximation, and
means responsive to said indicating signal for complementing said difference pulse coded signals.

2. The system in accordance with claim 1 which comprises,
a difference modulation coder having said accumulating means connected in a feedback path thereof, and
said complementing means are coupled in an output of said coder.

3. The system in accordance with claim 2 in which,
said coder includes a feedback loop including said feedback path, and
means are provided for coupling said complementing means in said coder output of said feedback loop.

4. The system in accordance with claim 2 in which said complementing means comprises,
means for performing an EXCLUSIVE OR type of logic function on signals at first and second input connections thereof,
means for coupling said difference pulse coded signals to said first input, and
means for coupling said indicating signal to said second input.

5. The system in accordance with claim 2 in which,
said coder includes a feedback loop comprising said feedback path, and
means are provided for coupling said complementing means in said coder output in a forward signal path portion of said feedback loop.

6. The system in accordance with claim 2 in which,
said feedback path includes a digital-to-analog converter responsive to an output of said accumulating means, and
means are provided for coupling said polarity indicating signal for utilization in said converter.

7. The system in accordance with claim 1 in which,
said pulse coded signals include a succession of multibit words each including a sign bit and magnitude bits, and
said complementing means includes means for complementing said sign bit in response to said indicating signal.

8. The system in accordance with claim 1 which further comprises,
means for detecting incipient overflow in said digital accumulating means,
means responsive to said detecting means for forcing said difference pulse coded signals to a signal state for one code bit time for reversing the direction of accumulation in said accumulating means.

9. The system in accordance with claim 1 which comprises in addition,
further means for digitally accumulating said pulse coded signals to produce a pulse coded digital approximation of said analog signal, and
means for connecting said propagating circuit for transmitting said pulse coded signals from an input of the first mentioned accumulating means to an input of said further accumulating means.

10. The system in accordance with claim 9 in which there are provided,
means for connecting said complementing means in said propagating circuit between inputs of said first mentioned accumulating means and said further accumulating means.

11. The system in accordance with claim 9 in which there are provided,
means for connecting said complementing means to said propagating circuit for supplying said pulse coded signals to both said first mentioned accumulating means and said further accumulating means.

12. The system in accordance with claim 1 which comprises,
a difference modulation coder having said accumulating means connected therein, and
means for connecting said complementary means to supply said pulse coded signals to an input of said accumulating means.

13. The system in accordance with claim 1 which comprises
a difference modulation decoder having said accumulating means connected therein, and
means for connecting said complementing means in said propagating circuit to supply said pulse coded signals to an input of said accumulating means.

14. The system in accordance with claim 1 in which,
means are provided for connecting said complementing means in an input to said accumulating means.

15. The system in accordance with claim 1 in which,
said accumulating means is a reversible binary counter having the direction of counting controlled by the binary signal state of said difference pulse coded signals.

16. The system in accordance with claim 15 in which,
said producing means include means responsive to an output of the most significant bit position of said counter for controlling said complementing means.

17. The system in accordance with claim 15 in which,
said producing means comprises means for deriving from said counter a signal indicating a binary all-ZERO condition in portions of said counter representing the magnitude of said digital approximation, and
means responsive to both said all-ZERO indicating signal and a no-pulse condition in said difference pulse coded signals for actuating said complementing means.

18. The system in accordance with claim 15 in which there are provided,
means for converting said digital approximation to a corresponding analog signal form,
means for coupling outputs of said counter representing the magnitude of said digital approximation in bit parallel to said converting means, and means responsive to said polarity change indicating signal for switching polarity of said analog signal form in response to changes in the binary signal state of such indicating signal.

19. The system in accordance with claim 1 in which there are provided, a difference modulation coder having said digital accumulator in a feedback path thereof, a difference modulation decoder having a further accumulator and a further cooperating indicating signal producing means connected therein, and means for coupling an output of said coder to an input of said decoder accumulation.

20. The system in accordance with claim 19 in which said difference coded signal complementing means includes, means in the output of said coder for inverting said difference pulse coded signals in response to each polarity change of said digital approximation in said coder, and means in said input of said decoder for inverting said difference pulse coded signals in response to each polarity change of said digital approximation in said further accumulating means of said decoder.

21. The system in accordance with claim 19 in which, said difference code complementing means includes means in said coder feedback loop, but in the forward signal path portion thereof, for inverting said difference pulse coded signals in response to changes in the binary signal state of said coder indicating signal, means are provided in said coder, and responsive to each change in the binary signal state of the indicating signal thereof, for complementing said digital approximation output of said coder accumulating means, and said decoder further includes means responsive to each change in the binary signal state of the decoder indicating signal for complementing the digital approximation output of said further accumualting means in said decoder.

22. The system in accordance with claim 1 in which, there is provided a difference modulation coder having said digital accumulating means connected in a feedback path thereof, and said accumulating means is a reversible shift register biased to contain a shift companded pulse code and having the direction of shifting thereof controlled by said difference pulse coded signals.

23. The system in accordance with claim 22 in which said feedback path is connected around a predetermined portion of the forward signal path of said coder to form a feedback loop, said difference code signal complementing means are connected in said forward signal path portion, a difference modulation decoder is provided, means are provided for coupling said difference pulse code output of said coder to an input of said decoder, further digital accumulating means and cooperating further means for producing a polarity change indicating signal as set forth for said coder are included in said decoder, and means are provided in said decoder and responsive to the indicating signal from said further producing means for complementing an output of said further accumulating means.

24. In a communication system for difference pulse coded digital signals having successive digital signal times in which the digital signal state represents an amplitude step of at least one predetermined size in bipolar, variable, analog information, means for indicating a change in polarity of said analog information, and means, responsive to an output of said indicating means, for complementing subsequent ones of said digital signals after such polarity change.

* * * * *

UNITED STATES PATENT AND TRADEMARK OFFICE

CERTIFICATE OF CORRECTION

PATENT NO. : 3,913,016

DATED : October 14, 1975

INVENTOR(S) : James C. Candy

It is certified that error appears in the above-identified patent and that said Letters Patent are hereby corrected as shown below:

In the specification, column 2, line 62, the second "Q" should read --$\overline{Q}$--. Column 4, line 2, after "digital" insert --signal--; line 51, "C2" should read --C2'--. Column 7, line 19, delete "employs". Column 9, line 48, " 19' " should read --19''--. Column 11, line 41, "FIG. 1" should read --FIG. 7--.

Signed and Sealed this

*thirteenth* Day of *April 1976*

[SEAL]

*Attest:*

RUTH C. MASON
*Attesting Officer*

C. MARSHALL DANN
*Commissioner of Patents and Trademarks*